United States Patent Office 3,501,418
Patented Mar. 17, 1970

3,501,418
PROCESS FOR PREPARING CRACKING
CATALYSTS
John S. Magee, Jr., Baltimore, George J. Surland, Woodbine, and Warren S. Briggs and Frank G. Ciapetta, Silver Spring, Md., assignors to W. R. Grace & Co., New York, N.Y., a corporation of Connecticut
No Drawing. Filed July 14, 1967, Ser. No. 653,331
Int. Cl. B01j $11/62, 11/40$
U.S. Cl. 252—450
13 Claims

ABSTRACT OF THE DISCLOSURE

A clay and silica-alumina semi-synthetic low surface area catalyst and an intimate admixture method of making the catalyst wherein the alumina content is supplied by acid leaching the clay and then mixing the slurry resulting from the acid leaching with a sodium silicate solution to precipitate the catalyst. In a further embodiment, the catalyst is promoted by the addition of an aluminosilicate molecular sieve.

This invention relates to a fluid cracking catalyst having a high cracking activity and a high thermal and steam stability, and to the process of preparing this catalyst. In one particular embodiment, this invention relates to a low surface area silica-alumina and clay cracking catalyst prepared by an intimate admixture process similar to that described in the co-pending application Ser. No. 591,420, filed Nov. 2, 1966, and now abandoned, but in which the alumina is supplied by acid leaching a portion of the clay component. In a further embodiment, the catalyst is promoted by incorporating a molecular sieve aluminosilicate zeolite into the silica-alumina-clay matrix.

In the catalytic cracking of hydrocarbon oils, the oil stock is vaporized by heating to a temperature of 800 to 1000° F. at greater than atmospheric pressure. The carbon vapors are intimately contacted with silica-alumina catalyst, wherein the high boiling point constituents are converted into gasoline. Several complex side reactions take place simultaneously with the cracking reactions, such as polymerization, alkylation and the like. As a result of these reactions, a carbonaceous deposit referred to in the art as "coke" is formed on the catalyst. This deposit severely impairs the cracking efficiency of the catalyst. Catalytic activity is restored by burning the deposit from the catalyst surface in a stream of oxidizing gas and the catalyst is returned to the cracking process. Such regeneration is usually carried out at temperatures above cracking temperature. The catalyst regeneration is exothermic and excessive heat is developed during this stage of the process.

It is known that short life and decreasing catalytic activity is due to the lack of heat and steam stability of the catalyst and occurs during the cracking process and in the regeneration stage. It is, therefore, important that the catalyst be relatively heat stable. Heat stabilization is particularly important in fluid cracking systems which employ finely divided solid catalysts. Thus, with the high degree of turbulence necessary in a fluid system, the catalyst undergoes physical deterioration with the production of a substantial quantity of fines. These fines are difficult to retain within the system and represent a loss which often cannot be tolerated. Research to develop catalysts which have a greater mechanical strength and longer operating life is a continuing process.

There have been several attempts to prepare cracking catalysts by the co-gelation technique. However, the products of the prior art processes are fine-sized chalky materials that have high attrition losses in fluid catalytic systems and are so soft that they are readily reduced to fines in the fluid catalytic cracking system. In addition, these catalysts had very low pore volumes and surface areas.

One of the criterion of catalyst stability to steam and thermal treatment is evidenced by the loss in surface area after a standard steam or thermal treatment. Thus, a conventional silica-alumina cracking catalyst may have a surface area of about 500 m.$^2$/g. before steam and thermal treatment and after steam and thermal treatment a surface area of only about 150 m.$^2$/g. After this initial drop in surface area, the catalyst is in an "equilibrium" state and retains the equilibrium surface area for the balance of the useful catalyst life.

We have found that a catalyst having a suitable attrition resistance can be prepared by an intimate admixture technique by careful control of reactant ratios and reaction conditions as is set forth in our previously referred to application. The catalyst prepared according to our process has a surface area lower than the fresh surface area of the catalyst prepared by other techniques, but is much more stable to steam and thermal treatment. Thus, on steam treatment, the catalyst does not lose the high proportion of surface area and, hence, activity that is typical of the conventional silica-alumina cracking catalyst.

The catalysts prepared in accordance with our invention have surface areas of about 200 to 350 m.$^2$/g., depending on whether they were promoted with a zeolite or not, and lose very little of this surface area on steam treatment.

The zeolite promoted products produced by the process of this invention have a greatly improved initial activity as compared with the unpromoted silica-alumina catalysts and at the same time retain the thermal and steam stability of the unpromoted intimate admixture catalysts Further, the use of zeolite aluminosilicates dispersed within a low surface area matrix, such as represented by the clay-silica-alumina matrix of the instant invention, is particularly advantageous in effecting a high efficiency use of the zeolite in the cracking process.

It is particularly noted here that another of the aspects of the invention is the preferred use of a stabilized non-alkali metal aluminosilicate, as contrasted with the use of alkali metal aluminosilicates typified by the prior art processes. The prior processes thus require additional ion exchange steps with a non-alkali metal cation to remove the deleterious alkali metal ion after the aluminosilicate has been dispersed within the gel mixture. This, of course, necessitates additional process time, cost and introduces another opportunity for catalyst contamination. The prior art has not sought to eliminate this problem in the manner disclosed herein as, among other reasons, it had always been thought, and which was true in most cases, that the non-alkali metals were unsuitable either because they still contained an undesirable amount of alkali ion (usually sodium ion) or because non-alkali ion exchange with a metal (usually a rare earth) was reversible. Thus, a large portion of the non-alkali metal cation would be lost by re-exchange with other undesirable cations in the process of the catalyst manufacture. As most of these cations were rare earth metals, their loss as well as necessitating an additional re-ion exchange step would be quite costly. It has been found that the use of so-called "stabilized" non-alkali metal aluminosilicates (which have a very low alkali metal content, in the order of 0.3 to 0.4 weight percent expressed as the oxide, and which have been found not to exhibit tendency to re-exchange with any undesirable ions which may be present in the solutions used in the catalyst preparation) precludes the use of the addition of cation exchange steps required in the prior art processes without any of the disadvantages thought inherent by the prior art to the use of non-alkali metal aluminosilicates.

The stabilized non-alkali metal aluminosilicates which may be used in the novel process disclosed herein are typified by the formula

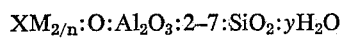

$$XM_{2/n}:O:Al_2O_3:2-7:SiO_2:yH_2O$$

where M represents H+ or any other cation except the alkali metals and $n$ is its valence, where $y$ can vary from 0 to 9 and X from 0 to 1. Suitable cations include magnesium, manganese, zinc, thorium, aluminum, etc., and more particularly the rare earths. A more complete discussion of stabilized aluminosilicates can be found in the co-pending application Ser. No. 553,272, filed May 27, 1966, and now abandoned.

In carrying out the process of our invention, there is first provided a 1 to 15 percent by weight $SiO_2$, preferably about 5.5 percent, aqueous alkali silicate solution maintained at a temperature between 70 to 150° F., preferably 75 to 100° F. Although any of the alkali metal silicates may be used for this solution, sodium silicate will be generally used as it is less costly. Therefore, for the purpose of simplicity, the invention will be described with respect to sodium silicate solution, unless otherwise stated.

A clay-alumina solution is prepared by dissolving or leaching the desired amount of $Al_2O_3$ from the clay with a strong mineral acid, preferably 1 to 10 molar sulfuric acid. The amount of acid required is a function of the amount of activated alumina, i.e., the amount of $Al_2O_3$ in the clay which can theoretically react with the $H_2SO_4$ according to the equation

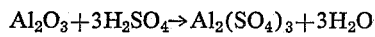

$$Al_2O_3 + 3H_2SO_4 \rightarrow Al_2(SO_4)_3 + 3H_2O$$

Thus, for a divalent acid such as sulfuric acid, 3.0 moles of acid are required per mole of activated $Al_2O_3$ desired. The amount of activated $Al_2O_3$ desired in the finished catalyst will vary with the particular catalyst but frequently will be from 0 to 10 weight percent of the finished catalyst, preferably 1 to 4 weight percent.

The actual leaching is effected by mixing the clay into a mineral acid solution at a temperature of 100 to 230° F. of $Al_2O_3$; normally this requires 0.5 to 16 hours, depending on the concentrations, temperatures, and amount of reactive alumina desired. The particular clay used is not critical and clays such as kaolin clay, halloysite, montmorillonite and bentonite may be used.

The clay-alumina slurry and the sodium silicate solution are then carefully mixed together by flowing the two solution, maintaining a carefully controlled flow ratio between the two solutions, into a suitable mixing chamber or, alternatively, into a continuous in-line mixing element such as a conventional pipe "Y," though more elaborate continuous mixing elements may advantageously be used. This flow ratio is controlled at a ratio of 0.25 to 1.0 g.p.m. of clay-alumina slurry per gallon of silicate solution and, within this range, the ratio and concentrations of the respective slurry and solution must be such that the pH of the mixture will be from 3 to 10, preferably 6 to 9.

Upon mixing, an intimate admixture of clay and silica-alumina will be formed almost instantaneously. One further advantage of this process is that no additional acid is required to precipitate the silica. After mixing, the intimate admixture slurry is recirculated for about 5 to 60 minutes to ensure complete mixing and precipitation. This slurry is then filtered and the resulting clay and silica-alumina intimate admixture filter cake then reslurried with water. Preferably, the reslurry will have a solids content of 2 to 20 weight percent.

The reslurry is then spray dried by conventional means and the resulting dried intimate admixture catalyst is washed by conventional washing techniques. The washing may, for example, be effected by successive washings with water or dilute $(NH_4)_2SO_4$ solution, or a combination of the two, followed by a filtration step after each washing. After the last filtration step, the intimate admixture is dried, for example, by heating overnight at between 220 to 450° F.

The product produced by the above process has been found to have a surface area after calcination for 3 hours at 1000 F. of from 200 to about 350 m.²/g. and to possess good attrition resistance and a reasonable, but low, catalytic activity. Since the primary purpose or use of the product will be as matrix material for a promoter, such as the catalytic zeolites, the low activity is immaterial and, in fact, may be desirable in that coke fouling of the pores and the consequent coke recovering of the promoter will not be induced. Similarly, there will be considerably less opportunity for the matrix to become diffusion bound and consequently less chance that the promoter contained within the matrix pores will be covered with diffusion bound products.

Where it is desired that the matrix contain more than 5 percent active alumina, it becomes difficult to get the intimate admixture to form, largely because of the increase in acidity of the clay-alumina slurry, which will necessarily increase as the amount of desired $Al_2(SO_4)_3$ is increased. However, we have found that this problem may be overcome by ammoniating the admixed solutions, for example, by adding sufficient ammonium hydroxide to bring the pH of the mixture up to a range of from 6 to 9. This will effect the precipitation of intimate admixture which may then be treated in the same manner as set forth above.

In a preferred embodiment, the catalyst matrix is promoted by the addition of a molecular sieve aluminosilicate zeolite, preferably of the type discussed herein on pages 4 and 5. This may be effected by adding the desired quantity of zeolite to the reslurry and then spray drying the promoted reslurry. The spray dried promoted catalyst may then be washed and dried in the same manner as the unpromoted catalyst.

The above processes are, of course, capable of modification or variation, particularly in the conventional steps, such as washing and spray drying. Further, it is conceivable that the molecular sieves may be added in some other step, even though the reslurry step is the most advisable. Further, it must be cautioned that once the molecular sieves have been added, the pH must be maintained above 3 to prevent deterioration of the molecular sieves.

The following examples are further illustrative of our invention and in no way limiting of the invention.

EXAMPLE I

This example illustrates the method according to our invention of preparing our catalyst matrix in which no ammoniation is required to precipitate the clay-silica-alumina matrix.

In this example, a solution of sulfuric acid was prepared by diluting 639 ml. (347 grams) of sulfuric acid to approximately 10 liters with water. 2300 grams of kaolin clay (2000 grams) were added to the acid solution with mixing. The clay acid slurry was then heated in a closed vessel to a temperature of 230° F. and maintained at this temperature for 1 hour to effect leaching. The slurry was then diluted to 11.2 liters by the addition of water. The slurry was then mixed with 5 percent by weight ($SiO_2$) sodium silicate solution by simultaneously pumping the sodium silicate solution and the slurry into a mixing chamber. The slurry was pumped at a rate of 0.25 g.p.m. and a temperature of 102° F. The sodium silicate solution was pumped at a temperature of 102° F. at a rate of 1.0 g.p.m. The pumping was continued for 11 minutes and 12 seconds. Upon contact of the slurry with the silicate solution, an intimate admixture precipitate was observed to form. The admixture slurry was then aged 15 minutes by recirculation. The pH of the slurry and the reaction temperature was observed to be 8.95 and 103° F., respectively. The slurry was then filtered and reslurred with water to a solids of 10.8 percent. The reslurry was then spray dried using a conventional spray drier operating under a tank pressure of 50 p.s.i.g. and an atomizing air pressure of 35 p.s.i.g. with an inlet temperature of 600° F. and outlet temperature of between 175 to 275° F.

The catalyst matrix product was then washed, maintaining a wash volume to catalyst volume of two, 5 times with a 4 percent ammonia sulfate solution at a temperature of 104° F. The catalyst was then washed 3 times with slightly basic water, pH 9.0, at a temperature of 104° F. After this washing, the matrix was given a final washing with water at 140° F. The catalyst was, of course, filtered after each washing to remove the excess wash solution. After washing, the catalyst was dried for about 4 hours at 400° F. in a forced draft oven.

EXAMPLE II

This example illustrates the method of producing our catalyst matrix according to our invention wherein an ammoniation step is required to form the intimate admixture matrix.

In this example, 730 ml. (1290 grams) of 96 percent sulfuric acid was diluted to 2190 ml. by the addition of water. 2300 grams of kaolin clay (2000 grams dry basis) were added with stirring to the acid solution. The acid slurry was then heated in a closed vessel to 230° F. and allowed to sand at this temperature for 1 hour. The slurry was then diluted to 11.2 liters by the addition of water. This slurry was then mixed with a 5.5 weight percent ($SiO_2$) sodium silicate solution in the same manner as Example I with the exception that the respective temperatures of the acid solution and the silicate solution were 73° F. and 74° F., respectively. The pumping was continued for 11 minutes and 25 seconds. The admixed slurry was then recirculated for about 15 minutes; however, no admixture formed. The pH of the admix slurry was observed to be 3.7. The pH was then adjusted to 10.2 by the addition of four liters of 14 percent ammonium hydroxide which resulted in the formation of an intimate admixture. The slurry was then filtered and reslurred with water to a 10 percent solids content. Two 2-gallon samples were removed from the reslurry, one of which was spray dried, washed and dried in the same manner as Example I. The remaining sample will be discussed in Example III.

EXAMPLE III

This example illustrates the method according to our invention of adding a crystalline aluminosilicate zeolite molecular sieve to the intimate admixture catalyst. In this example, 85.5 grams of the rare earth promoted type X stabilized crystalline aluminosilicate molecular sieve were added to the remaining reslurry sample from Example II. The pH of the reslurried sample remained at 10.2. The slurry was then spray dried, washed and dried in the same manner as Example I.

EXAMPLE IV

Additional samples were made following the same procedures as set forth in Examples I, II, and III, but with certain modifications in the composition of the matrix produced and the percent of rare earth stabilized aluminosilicate molecular sieves contained therein, and the temperatures and pH's at which the clay alumina acid solution and the silicate solution were reacted (mixed).

The surface areas and pore volumes of the examples were determined after 3 hours calcination at 1000° F. by conventional Brunauer-Emmett-Teller methods using nitrogen.

The micro activities of these catalysts were then determined and compared with the micro activity of the conventional high alumina silicate catalyst. Briefly, the micro activity test comprises feeding a small sample of West Texas gas oil by a syringe into a glass reactor, in this instance maintained at 800° F., containing a small sample of the catalyst to be examined. The reaction products were then analyzed quantitatively and qualitatively by conventional techniques, and the volume percent conversion calculated. A weight hourly space velocity of 16 was used in the instant tests. The high alumina comparison catalyst used was a conventional silica alumina catalyst having an $Al_2O_3$ content of from 25 to 30 percent by weight, normally 27 percent.

The results of these tests are summarized in Table I.

TABLE I

| Reference Number | Characteristics of Initial Admix Solution | | | Composition of Catalyst, Weight Percent | | | | Surface Area and Pore Volume | | Micro-activity at 900° F. and 16 WHSV | | |
|---|---|---|---|---|---|---|---|---|---|---|---|---|
| | Temp., °F. | $Al_2O_3$, Theo. Percent[1] | Slurry, pH[2] | $Al_2O_3$ | $Na_2O$ | $SO_4$ | REO[3] | S.A., m.²/g. | P.V., cc./g. | Vol. Percent Conv. | Wt. Percent $H_2$ | Wt. Percent Coke (based on feed) |
| 1 (II)[4] | 74 | 50 | 3.7 | 19.7 | 0.04 | 0.06 | | 297 | 0.40 | 54.2 | 0.05 | 4.2 |
| 1P (III)[4] | 74 | 50 | 3.7 | 21.7 | 0.05 | 0.07 | 2.87 | 113 | 0.45 | 77.9 | 0.04 | 9.1 |
| 2 | 100 | 50 | 4.3 | 19.2 | 0.04 | 0.07 | | 353 | 0.40 | 51.8 | 0.05 | 3.4 |
| 2P | 100 | 50 | 4.3 | 21.8 | 0.08 | 0.08 | 2.84 | 369 | 0.41 | 81.3 | 0.06 | 9.7 |
| 3 | 100 | 44 | 9.7 | 18.7 | 0.06 | 0.08 | | 241 | 0.39 | 36.8 | 0.02 | 1.4 |
| 3P | 100 | 44 | 9.7 | 21.2 | 0.09 | 0.11 | 3.05 | 202 | 0.43 | 73.6 | 0.11 | 8.5 |
| 4 | 100 | 44 | 8.9 | 19.7 | 0.06 | 0.05 | | 289 | 0.53 | 35.8 | 0.03 | 1.7 |
| 4P | 100 | 44 | 8.9 | 21.6 | 0.05 | 0.06 | 2.45 | 306 | 0.56 | 72.2 | 0.03 | 7.9 |
| 5 (I)[4] | 102 | 44 | 8.9 | 19.9 | 0.05 | 0.20 | | 218 | 0.80 | 22.2 | 0.02 | 1.1 |
| 5P | 102 | 44 | 8.9 | 21.8 | 0.08 | 0.19 | 2.77 | 275 | 0.76 | 71.8 | 0.03 | 7.5 |
| 6P | 100 | 44 | 9.1 | 21.4 | 0.07 | 0.04 | 2.85 | 323 | 0.58 | 73.5 | 0.07 | 8.6 |
| 7P | 100 | 44 | 7.9 | 21.9 | 0.04 | 0.03 | 2.74 | 328 | 0.51 | 79.0 | 0.03 | 9.6 |
| 8P | 100 | 46 | 7.3 | 20.4 | 0.07 | 0.11 | 2.73 | 293 | 0.43 | 84.2 | 0.02 | 8.9 |
| Commercial Hi Alumina Reference Catalyst | | | | | | | | 400 | 0.8 | 63.3 | 0.08 | 6.6 |

[1] Theoretical percent of the $Al_2O_3$ content of the clay converted to active $Al_2O_3$.
[2] Ammoniation required where pH below 5.0.
[3] Rare earth oxide provided by molecular sieve promoter—relative index of quantity of promoter in catalyst.
[4] (I), (II), (III) Illustrative examples set forth in specification.
The lettered reference numbers represent the same matrix as the corresponding unlettered reference numbers, but promoted with a rare earth oxide type X crystalline zeolite.

From the table it may be seen that in all instances the unpromoted clay-silica-alumina matrix of our invention has a substantially lower activity than the commercial Hi Alumina reference catalyst. The promoted form of our catalyst has an activity substantially greater than the reference catalyst and represents a substantial improvement.

Obviously, many modifications and variations may be made without departing from the essence and scope of our invention and only such limitations as are set forth in the appended claims should be applied.

What is claimed is:
1. A process of preparing a low surface area catalyst, having a clay-silica-alumina matrix, comprising:
 (a) providing a suitable $Al_2O_3$ containing clay;
 (b) acid leaching up to 50 percent of the $Al_2O_3$ contained in said clay with a strong mineral acid solution to provide a clay and dissolved aluminum salt slurry;
 (c) diluting the slurry with sufficient water to provide a slurry having an $Al_2O_3$ content of up to 8 weight percent;

(d) providing a 1 to 15 percent by weight $SiO_2$ alkali metal silicate solution;

(e) continuously mixing the slurry and silicate solution together at a temperature of from 70 to 150° F. and at a flow rate ratio of 0.1 to 1.0 gallons per minute of slurry per g.p.m. of silicate solution, and adjusting the concentrations of clay, silicate and $Al_2O_3$ and said flow ratio to provide an admix solution having a pH of from 3 to 10, an intimate admixture of clay-silica-alumina being formed when the pH of the admixture is from 3.5 to 9.0;

(f) adjusting the pH of the admix solution, where the pH of the admix solution is below 4.5, to a pH of from 6 to 9, to ensure formation of the intimate admixture;

(g) recirculating the intimate admixture solution of step (f) to form an admixture slurry;

(h) filtering the admixture slurry and then reslurrying with water to a solid content of 10 to 20 percent by weight;

(i) spray drying the reslurry whereby a spray dried intimate admixture catalyst matrix of clay-silica-alumina is formed;

(j) washing the catalyst;

(k) drying the catalyst.

2. The process of claim 1 wherein the concentrations and flow rate ratio of the dissolved aluminum salt slurry and the silicate solutions are adjusted to provide an admix solution having a pH of from 6 to 9, whereby the intimate admixture forms without the necessity of an additional pH adjustment step.

3. The process of claim 1 wherein the concentrations and flow rate ratio of the clay dissolved aluminum salt slurry and the silicate solution are adjusted to provide an admix solution having a pH of from 3 to 5 and wherein this pH is adjusted to a pH of from 6 to 9 by ammoniating the admix solution, thereby causing the intimate admixture to form.

4. The process of claim 1 wherein the clay is acid leached by admixing the clay to a strong mineral acid solution having a concentration of from 1 to 10 M. and then heating the solution within a closed vessel to a temperature of from 100 to 230° F. for 0.5 to 16 hours.

5. The process of claim 1 wherein the clay is selected from the group consisting of kaolin clay, halloysite and bentonite.

6. The process of claim 1 wherein a molecular sieve crystalline aluminosilicate zeolite is dispersed within the catalyst matrix by adding the desired amount of said zeolite to the solution of any step subsequent to the adjustment of the pH to above 3 but prior to spray drying.

7. The process of claim 1 wherein a molecular sieve crystalline aluminosilicate zeolite is dispersed within the catalyst matrix by adding the desired amount of said zeolite to the reslurry prior to spray drying.

8. The process of claim 6 wherein the zeolite has the general formula:

$$XM_{n/2}O:Al_2O_3:2\text{--}6.5SiO_2:yH_2O$$

wherein M is a metal cation and $n$ is its valence and X can vary from 0 to 1 and $y$ can vary from 0 to 9.

9. The process of claim 8 wherein the zeolite has the general formula:

$$XM_{n/2}O:Al_2O_3:3\text{--}6.5SiO_2:yH_2O$$

10. The process of claim 8 wherein the zeolite has the general formula:

$$XM_{n/2}O:Al_2O_3:2\text{--}3SiO_2:yH_2O$$

and M is comprised primarily of rare earth metal cations.

11. The process of claim 8 wherein the zeolite is a stabilized zeolite having an alkali metal content, expressed as the oxide, in the order of 0.3 to 0.4 weight percent.

12. A catalytic composition comprising a clay-alumina-silica intimate admixture matrix having a surface area of from 150 to 400, and a pore volume of from 0.2 to 1.0 cc./g., and consisting essentially of 50 up to 100 weight percent clay, up to 5 weight percent active alumina and up to 50 weight percent silica, and wherein the clay is deficient in its original alumina content to the extent of said active alumina.

13. The catalytic composition of claim 12 wherein the composition consists essentially of a crystalline aluminosilicate zeolite molecular sieve distributed within said intimate admixture matrix.

References Cited

UNITED STATES PATENTS

| | | | |
|---|---|---|---|
| 2,400,020 | 5/1946 | Pierce et al. | 252—450 X |
| 2,967,157 | 1/1961 | Robinson et al. | 252—450 |
| 3,210,266 | 10/1965 | Michael et al. | 252—450 X |
| 3,406,124 | 10/1968 | Eastwood et al. | 252—455 |

DANIEL E. WYMAN, Primary Examiner

C. F. DEES, Assistant Examiner

U.S. Cl. X.R.

252—453, 455